April 21, 1925.
E. B. KILLEN
RUBBER TIRE
Filed Dec. 21, 1922
1,534,529
2 Sheets-Sheet 1
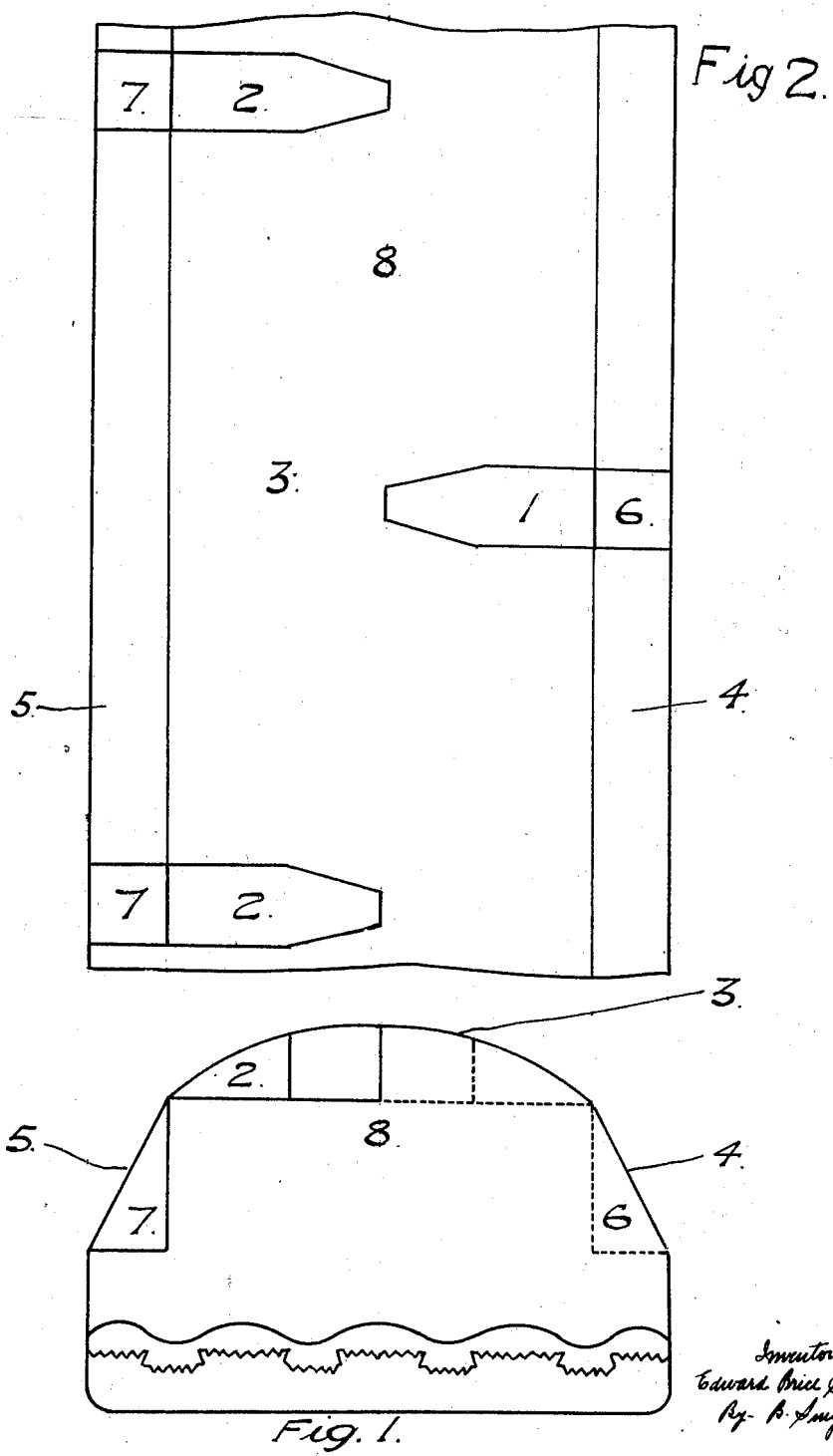

April 21, 1925.  1,534,529
E. B. KILLEN
RUBBER TIRE
Filed Dec. 21, 1922  2 Sheets-Sheet 2
Fig. 4.
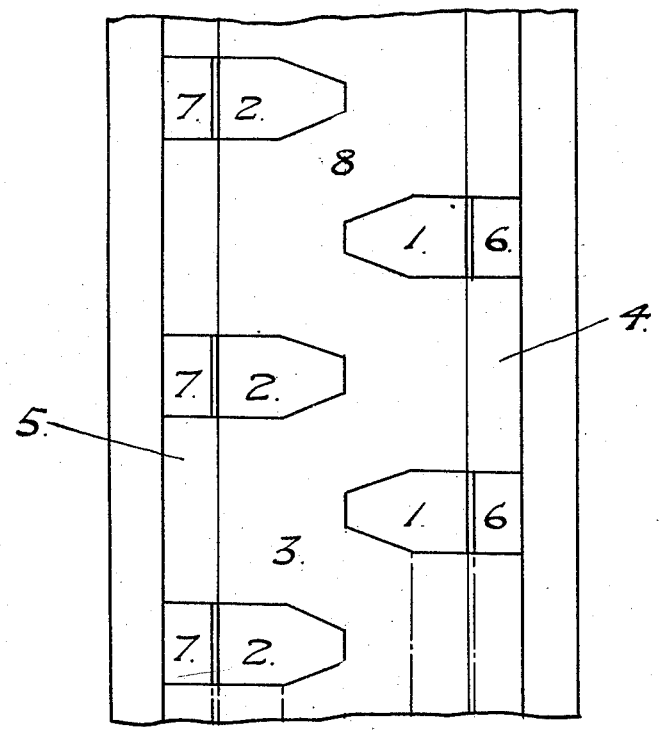
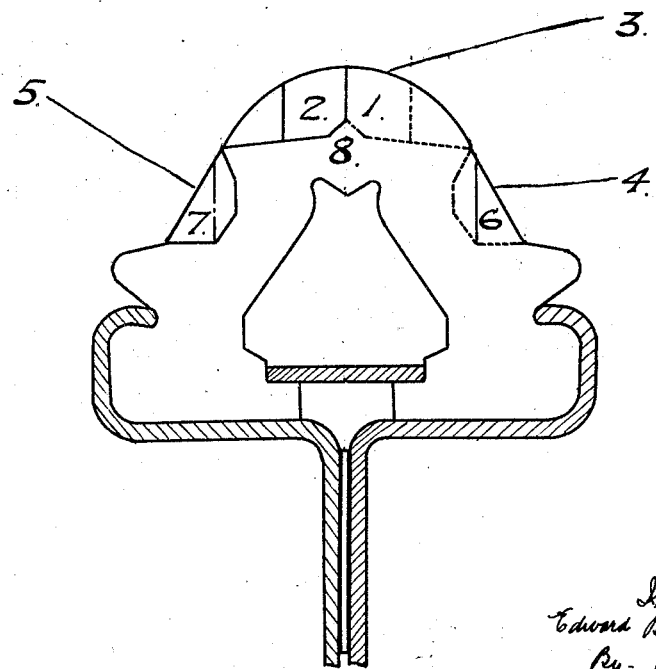
Fig. 3.
Inventor—
Edward Brice Killen
By B. Singer
Atty Patented Apr. 21, 1925.

1,534,529

UNITED STATES PATENT OFFICE.

EDWARD BRICE KILLEN, OF LONDON, ENGLAND.

RUBBER TIRE.

Application filed December 21, 1922. Serial No. 608,251.

*To all whom it may concern:*

Be it known that I, EDWARD BRICE KILLEN, of 27 Queen Victoria Street, London, E. C. 4, England, have invented certain new and useful Rubber Tires, of which the following is a specification.

My invention relates to the treading circumference of tires, including the treading circumference of existing solid rubber band types of tires, which have a single metal base foundation to which the rubber of the tire is attached by means of vulcanite, and one object of this invention is to increase the flexibility or shock absorbing qualities of existing types of solid rubber band tires under minimum and maximum loads, by means of a new type of flexible tread, without requiring to change the existing rubber compounds or to scrap many of the existing tire moulds.

In existing solid rubber band tires the treading circumference of the tire has practically no shock absorbing qualities or give in road contact when carrying minimum loads, and very little when carrying maximum loads, because of the fact that the tire's centre line is not sufficiently free and flexible to allow the rubber to give or be easily displaced in road contact under minimum load. One object of this invention is to enable solid rubber band tires to be manufactured to have better shock absorbing qualities (give in road contact) under minimum load and yet be capable of carrying efficiently heavy loads or overloads as and when required.

This invention when made use of also prevents dangerous side-slipping and skidding in all existing types of solid rubber band tires, which serious defects exist in practically all to-day's solid rubber band tires, particularly when running on slippery or cambered roads.

In order that my invention may be properly understood and readily carried into effect, I have hereunto appended two sheets of drawings, of which—

Figure 1 is a cross-section of one type of my outer circumference formed on a solid rubber band tire, showing the deep and strong cavities extending from the tire's centre-line to each right and left side of the tire on said outer circumference, having strong supporting rubber walls all round each cavity.

Figure 2 is a plan of my outer circumference of the tire as shown in Figure 1, showing the strong treading staggered cavities formed on the tire from its centre-line to each right and left side of the tire and the strong rubber wall between each cavity on the tire's centre-line.

Figure 3 is a cross-section of another type of my outer circumference constructed in another type of tire having an air-chamber formed within the tire, which outer circumference has deep and strong cavities extending from the tire's centre-line outwards and down each right and left sloping side.

Figure 4 is a plan of my outer circumference of a tire as shown in Figure 3, showing the strong treading staggered cavities which extend from the tire's centre-line outwards and down each right and left sloping side, having strong supporting rubber walls entirely surrounding each cavity.

My construction is as follows:—

I mould the outer treading circumference of the tire with strong treading cavities 1 and 2 and preferably to the arc of a circle 3 but in cross-section this outer arcuate tread circumference may be formed having any well known serrated or ribbed construction if required, and form at each side of said arc of a circle right and left sloping sides 4 and 5, which sides are constructed having suitable strong cavities 6 and 7. The treading cavities preferably extend from the tire's centre-line to each right and left side of tire, and are suitably staggered as they extend over the tire's wide effective tread. The width of each treading cavity circumferentially may be from ½ an inch to one inch, and each cavity is constructed to vary much in depth and shape in the tire's outer circumference as and when required according to the type of tire used. The outer circumference of the tire is constructed to allow the rubber on and about its centre-line 8 and over a great effective width of its tread to be easily displaced as and when required, according to the shock received or load carried.

An important feature about the tread cavities formed on the outer circumference of the tire is that they enable the rubber on and about the tire's centre-line 8 to be displaced into said deep cavities prepared for the reception of the rubber, a thing impossible in existing types of solid rubber band tires, where the rubber on and about the tire's centre-line is not free and cannot be displaced or compressed vertically on and about the tire's centre line sufficiently to allow more than say about 1/8 to 1/4 of an inch of give in road contact to take place. By making use of this new flexible tread construction, which becomes effectively narrow or wide as and when required and because of the flexibility of the tread and the fact that no objectionable wave or hill of rubber is formed in front of the tire when running on the road, even at high speeds, the existing well known types of solid rubber band tires can be manufactured having much better shock absorbing qualities.

In this tire's cross section the deep treading cavities begin on and about the tire's centre line 8 and extend from the tire's centre line to the tire's right and left sides or edges, thereby enabling the rubber on and about the tire's outer circumference 3 and right and left sloping sides 4 and 5, to be flexible under minimum load, because the rubber on the tire is easily displaced under a minimum shock or load. In fact the deep strong cavities 1 and 2 on the tread and 6 and 7 on the right and left sloping sides 4 and 5 of the tire allow the effective treading width of the tire to be greatly increased under heavy loads or shocks, thereby strengthening the tire in effect.

All the cavities as they run from the tire's centre-line 8 to the extreme right and left sloping sides 4 and 5 of the tire are surrounded and supported everywhere by abnormally strong, but flexible rubber walls, which construction of tread allows the rubber in the tread to have improved shock absorbing qualities under minimum loads, and great effective width and strength under heavy loads or when overloaded.

With this flexible construction of tread no objectionable wave or hill of rubber is formed in front of the tire when running on the road as happens in existing solid rubber band tires, and therefore the speed of this tire is improved, and softer rubber compounds may be used in this tire with the object of obtaining better give (shock absorbing qualities) in road contact. In existing solid rubber tires the softer the rubber compound used in the tire the greater is the objectionable wave or hill of rubber formed in front of the existing tire when running on the road, but when solid rubber tires are manufactured with this flexible type of tread with its free flexing centre line, the objectionable wave or hill of rubber is broken and overcome by the strong cavities which run in this tire from the tire's centre line to each right and left sloping side.

This type of flexible tread may be used on all types of solid rubber tires, and also on other types of tires which require better shock absorbing qualities under minimum loads in combination with better non-skidding non-side-slipping qualities.

The tread cavities 1 and 2 and sloping side cavities 6 and 7 may be manufactured in all suitable numbers, shapes and dimensions to suit the type of tire manufactured, provided they are constructed having abnormally strong walls all round them.

This invention refers only to the construction of the outer circumference and treads of tires, and when used in solid rubber band tires and in non-inflated rubber tires manufactured with an endless air chamber which is formed within the tire or beneath the base of the tire's centre line, or in fact in any other suitable type of tire, it greatly improves the tire's shock absorbing and non-skidding non-side-slipping qualities under all running conditions.

In solid rubber band types of tires having a metal base foundation as shown in Figures 1 and 2, the strong rubber walls between each treading cavity on the tire's centre-line may be from say 2 to 3 inches wide, see Figure 2, and in non-inflated types of tires where an endless air cavity is formed within the tire as shown in Figures 3 and 4, the strong rubber walls between each treading cavity on the tire's centre line may be from say 3/4 of an inch up to 1 1/2 inches wide, according to the type of tire manufactured (see Figure 4).

I wish it to be understood that my invention does not extend to any part of the tire except the treading circumference of the tire and its right and left sloping cavity sides, neither does my invention extend to any tire in which the tread stands upright without having sloping sides, or in which the tread of the tire does not become more or less narrow in effect under minimum load and wide in effect under maximum load or overload.

Having now particularly described and ascertained the nature of my said invention and in what manner the same is to be performed, I declare that what I claim is:—

A rubber tire the tread of which has a cross-sectional profile comprising a central arcuate portion merging into right and left sloping side portions, deep grooves extending transversely of the tire from the apex of said arcuate portion down one side thereof, similar grooves in the adjacent sloping side portion and aligned with the first-mentioned grooves, other similarly formed grooves extending from the apex of the arcuate tread portion down the opposite side of the tire, the grooves on one side of said tread apex being disposed intermediate those on the other side.

In testimony whereof I affix my signature in presence of two witnesses.

EDWARD BRICE KILLEN.

Witnesses:
    JOHN LIDDLE,
    JOHN TRAIN LIDDLE.